United States Patent
Chen et al.

(10) Patent No.: US 7,956,585 B2
(45) Date of Patent: Jun. 7, 2011

(54) MUTUAL BLANKING FOR A MULTI-CHANNEL CONVERTER

(75) Inventors: An-Tung Chen, Pingjen (TW); Jun-Yao Huang, Madou Town (TW); Fu-Shiang Lai, Taichung (TW)

(73) Assignee: Richtek Technology Corp., Hsinchu (TW)

(*) Notice: Subject to any disclaimer, the term of this patent is extended or adjusted under 35 U.S.C. 154(b) by 510 days.

(21) Appl. No.: 12/216,727

(22) Filed: Jul. 10, 2008

(65) Prior Publication Data

US 2009/0015069 A1    Jan. 15, 2009

(30) Foreign Application Priority Data

Jul. 13, 2007    (TW) ................................ 96125662 A

(51) Int. Cl.
*G05F 1/10*    (2006.01)
(52) U.S. Cl. ........................................ 323/220; 323/282
(58) Field of Classification Search .................. 323/220, 323/224, 235, 250, 282–288; 363/21.09, 363/25, 26, 97, 98, 89, 21.07; 327/105, 113, 114

See application file for complete search history.

(56) References Cited

U.S. PATENT DOCUMENTS

| | | | | |
|---|---|---|---|---|
| 5,742,151 A * | 4/1998 | Hwang | ........................ | 323/222 |
| 6,836,103 B2 * | 12/2004 | Brooks et al. | .................. | 323/282 |
| 7,005,836 B1 * | 2/2006 | Rice | .............................. | 323/288 |
| 7,019,497 B2 * | 3/2006 | Umminger et al. | ........... | 323/220 |
| RE39,976 E * | 1/2008 | Schiff et al. | .................... | 323/285 |
| 7,615,982 B1 * | 11/2009 | Guo | ............................... | 323/285 |

* cited by examiner

*Primary Examiner* — Rajnikant B Patel
(74) *Attorney, Agent, or Firm* — Rosenberg, Klein & Lee

(57) ABSTRACT

A shutter circuit is provided for a multi-channel converter to blank the switching noise produced by the switching of the converter. The shutter circuit monitors the switching of the switches in the output stages of the converter, and when one channel performs switching, the shutter circuit will send a signal to other channels to block the current sensors thereof. The current sensors are so blocked for a period not to sense the switching noise. The mutual interference between the channels due to the switching noise of the converter is eliminated.

18 Claims, 8 Drawing Sheets

MUTUAL BLANKING FOR A MULTI-CHANNEL CONVERTER

FIELD OF THE INVENTION

The present invention is related generally to a switching converter and, more particularly, to an apparatus and method for blanking switching noise in a switching converter.

BACKGROUND OF THE INVENTION

In a switching converter, the switching elements generate large power bounce, ground bounce and switching noise when the switching elements turn on and turn off. The switching noise is mixed with signals through power lines and substrate and some common block, for example bandgap reference generator and comparator. If switching noise is superimposed on an analog signal that represents a sensing signal and the signal is sensed in this load state, the controller will be fault function. The fault function could be that the switching elements of other power switching converters turn on and turn off at the wrong timing.

FIG. 1 shows a conventional multi-channel switching converter 100 including several channels 106, 108, ..., 110. In the first channel 106, transistors MH1 and ML1 are serially connected between a power line VIN and a ground line or substrate GND, a driver 116 generates signals U1 and L1 according to a pulse-width modulation (PWM) signal PWM1 to switch the transistors MH1 and ML1 so as to generate an output voltage VOUT1, voltage divider resistors R1 and R2 divide the output voltage VOUT1 to generate a feedback signal FB1, a current sensor 118 detects the current flowing through the transistor MH1 to generate a current-sensing signal ISENSE1, and a controller 114 generates the pulse-width modulation signal PWM1 according to the feedback signal FB1 and the current-sensing signal ISENSE1. In the second channel 108, transistors MH2 and ML2 are serially connected between the power line VIN and the ground line or substrate GND, a driver 122 generates signals U2 and L2 according to a pulse-width modulation signal PWM2 to switch the transistors MH2 and ML2 so as to generate an output voltage VOUT2, voltage divider resistors R3 and R4 divide the output voltage VOUT2 to generate a feedback signal FB2, a current sensor 124 detects the current flowing through the transistor MH2 to generate a current-sensing signal ISENSE2, and a controller 120 generates the pulse-width modulation signal PWM2 according to the feedback signal FB2 and the current-sensing signal ISENSE2. In the N-th channel 110, transistors MHN and MLN are serially connected between the power line VIN and the ground line GND, a driver 128 generates signals UN and LN according to a pulse-width modulation signal PWMN to switch the transistors MHN and MLN so as to generate an output voltage VOUTN, voltage divider resistors R5 and R6 divide the output voltage VOUTN to generate a feedback signal FBN, a current sensor 130 detects the current flowing through the transistor MHN to generate a current-sensing signal ISENSEN, and a controller 126 generates the pulse-width modulation signal PWMN according to the feedback signal FBN and the current-sensing signal ISENSEN.

In the converter 100, the multiple channels 106, 108, ..., 110 are integrated in a single chip 102 and all the channels 106, 108, ..., 110 share the common power line VIN as well as the ground line or substrate GND. Package inductances Lp1, Lp2, ..., LpN are resulted from bouning wires, and package inductances Lg1, Lg2, ..., LgN are resulted from bouning wires between the ground line GND and the transistors ML1, ML2, ..., MLN, respectively. Due to the switching of the transistors MH1, ML1, MH2, ML2, ..., MHN, MLN in the channels 106, 108, ..., 110, power bounce and ground bounce are produced and mutually interfere each other therebetween through the common power line VIN as well as the ground line or substrate GND. The power bounce and ground bounce are also known as switching noise, and in addition to the common power line VIN and the ground line or substrate GND, they may also introduce mutual interference between the channels through some other common elements, for example bandgap reference generator and comparator.

FIG. 2 is a partially enlarged view of the channel 106, and FIG. 3 is a waveform diagram of the current I1 and voltage V1 on the package inductance Lp1 of FIG. 2, in which waveform 200 represents the current I1 and the other 202 represents the voltage V1. Referring to FIGS. 2 and 3, when the signal U1 switches the transistor MP1, the current I1 on the package inductance Lp1 varies, as shown by the waveform 200, thereby resulting in ripples of the voltage V1 on the package inductance Lp1, as shown by the waveform 202, and further resulting in the switching noise Snoise on the power line VIN. The greater the variation of the current I1 is, the greater the switching noise Snoise is. Besides, since all the channels 106, 108, ..., 110 share the common power line VIN, the switching noise Snoise generated on the channel 106 will interfere the other channels 108, ..., 110.

FIG. 4 further illustrates the influence brought by the switching noise Snoise of FIG. 2, in which waveform 300 represents a threshold Verror1, waveform 302 represents the current-sensing signal ISENSE1, waveform 304 represents the signal U1, waveform 306 represents the switching noise Snoise, waveform 308 represents another threshold Verror2, waveform 310 represents the current-sensing signal ISENSE2, and waveform 312 represents the signal U2. The threshold Verror1 is produced by amplifying the difference between the feedback signal FB1 and a preset reference voltage with an error amplifier, and the threshold Verror2 is also a result of amplifying the difference between the feedback signal FB2 and the preset reference voltage. Taking the channels 106 and 108 for example, under normal operation, when the signal U1 turns to low, the transistor MH1 is turned on and will not be turned off unless the current-sensing signal ISENSE1 rises up to the threshold Verror1, as indicated between time t1 and time t2. Likewise, when the signal U2 turns to low, the transistor MH2 is turned on and will not be turned off unless the current-sensing signal ISENSE2 rises up to the threshold Verror2. However, at time t1, since the transistor MP1 is turned on, the switching noise Snoise is produced, as shown by the waveform 306. When the switching noise Snoise superimposes on the current-sensing signal ISENSE2 through the common power line VIN, as shown by the waveform 310, the channel 108 will perform a misoperation and turn off the transistor MH2 prematurely.

Therefore, it is desired an apparatus and method for preventing a switching converter from misoperation caused by switching noise.

SUMMARY OF THE INVENTION

An object of the present invention is to provide an apparatus and method for blanking switching noise in a switching converter.

Another object of the present invention is to provide an apparatus and method for mutual blanking of switching noise in a switching converter.

According to the present invention, a switching converter includes multiple channels. Each channel has an output stage having at least one switch, a current sensor to monitor an output current to generate a first signal, and a controller to generate a second signal according to a first signal to switch the at least one switch to generate the output current. A shutter circuit detects the switching information of the switches of the channels. When one channel performs switching, the shutter circuit generates a blanking signal to block the current sensors of the other channels for a period. The blocked current sensors will not sense the switching noise during the blanking period, and thereby the mutual interference between the channels caused by the switching noise is eliminated.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
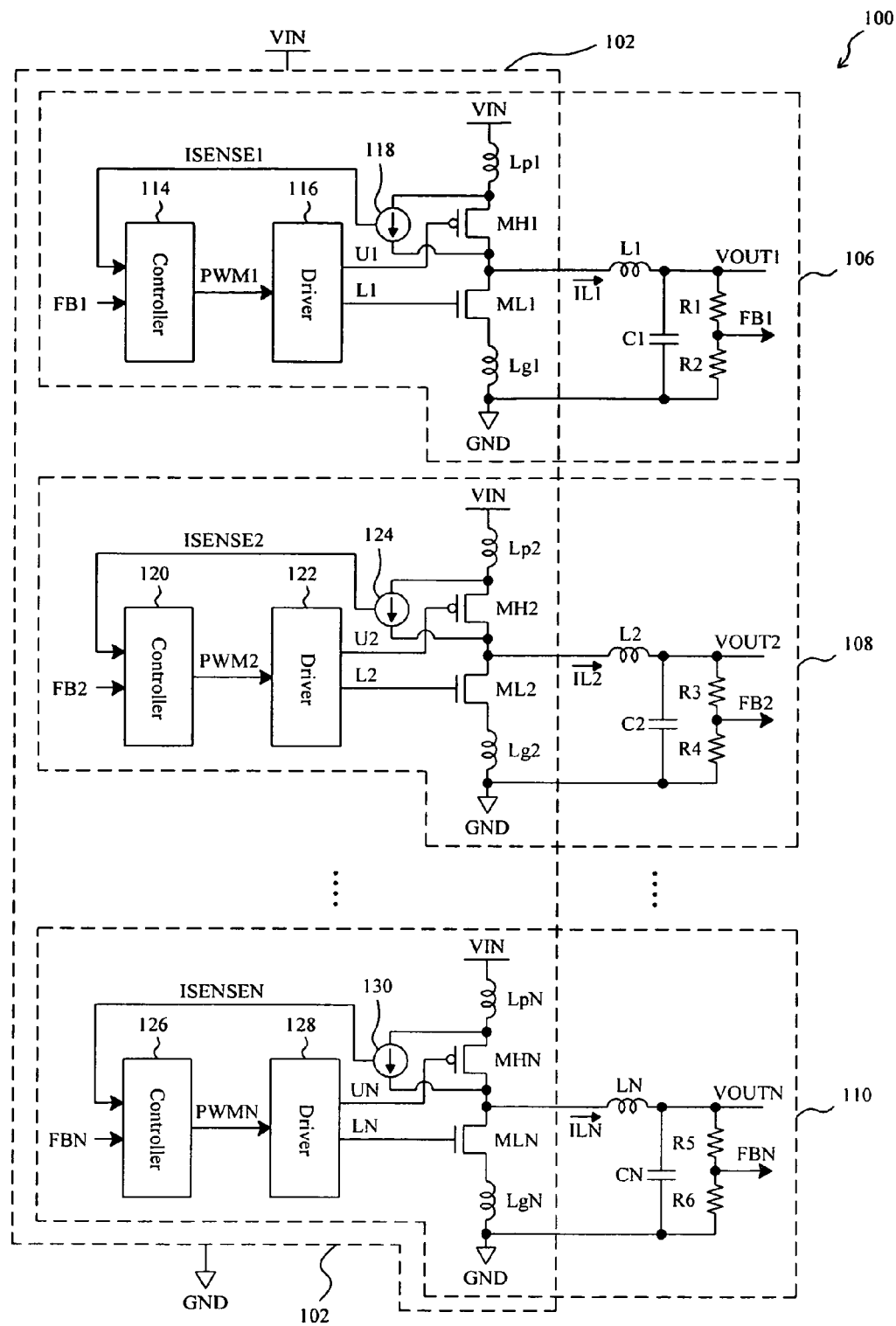
FIG. 1 is a conventional multi-channel switching converter.
Figure 2:
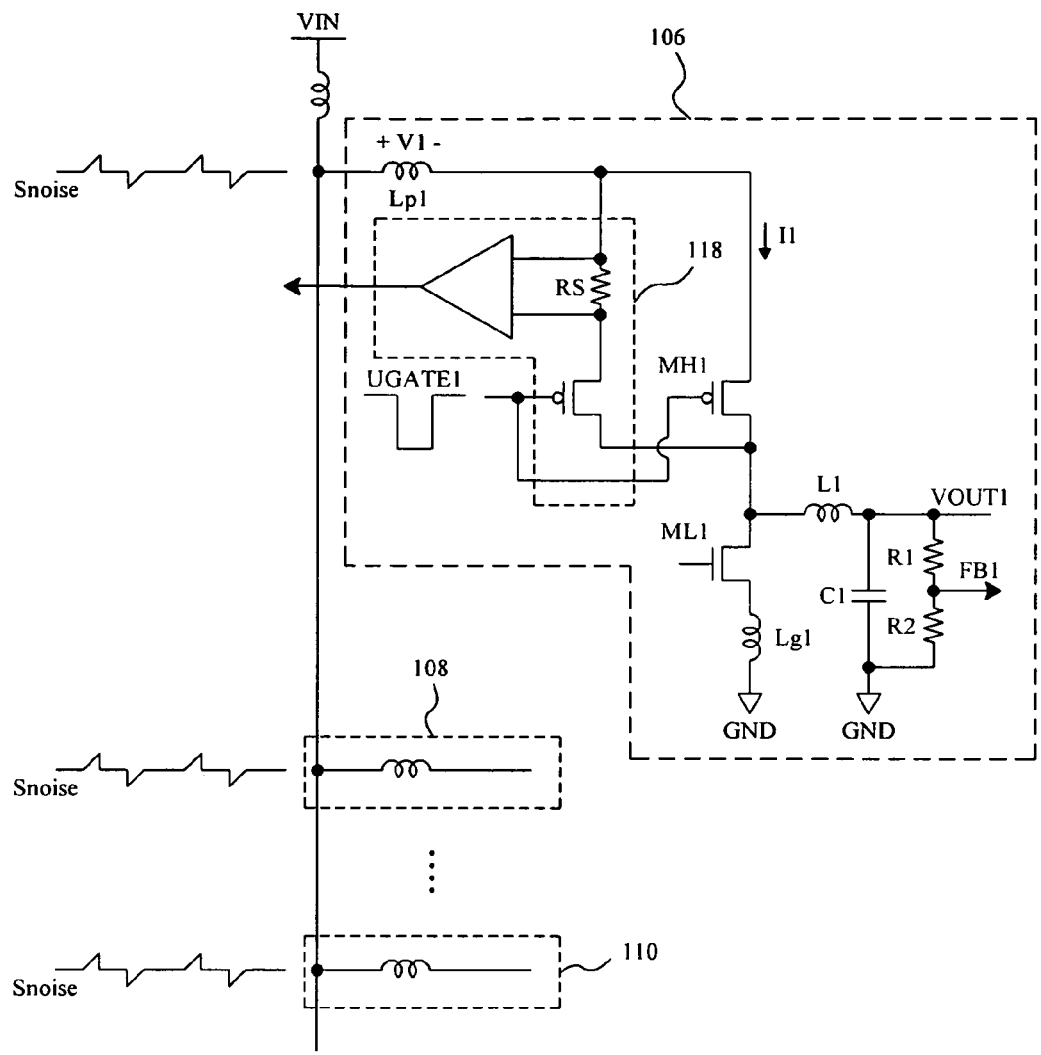
FIG. 2 is a partially enlarged view of a channel of FIG. 1.
Figure 3:
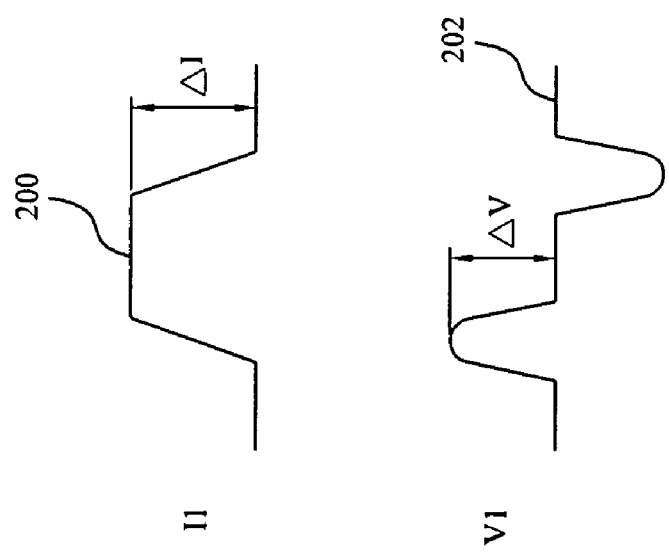
FIG. 3 is a waveform diagram of the current and voltage on a package inductance of FIG. 2.
Figure 4:
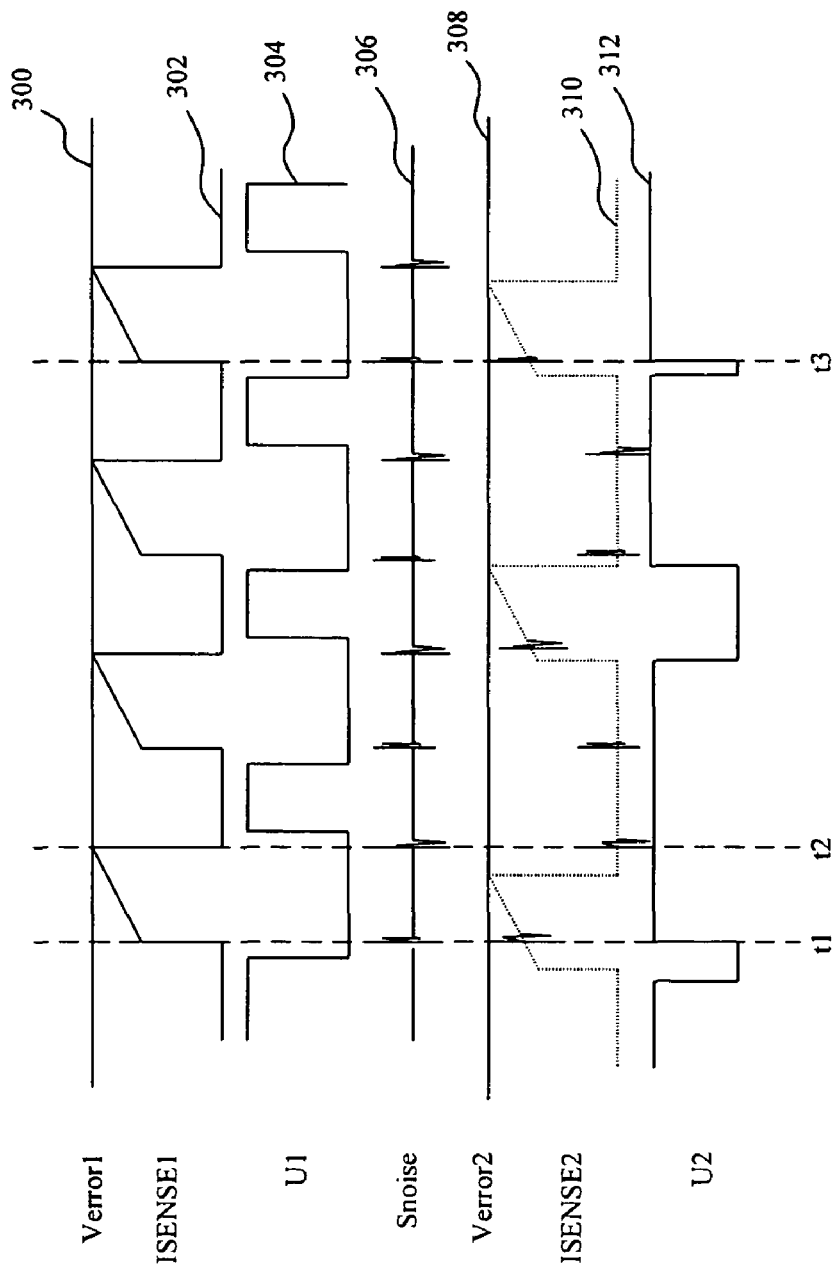
FIG. 4 illustrates the influence brought by the switching noise of FIG. 2.
Figure 5:
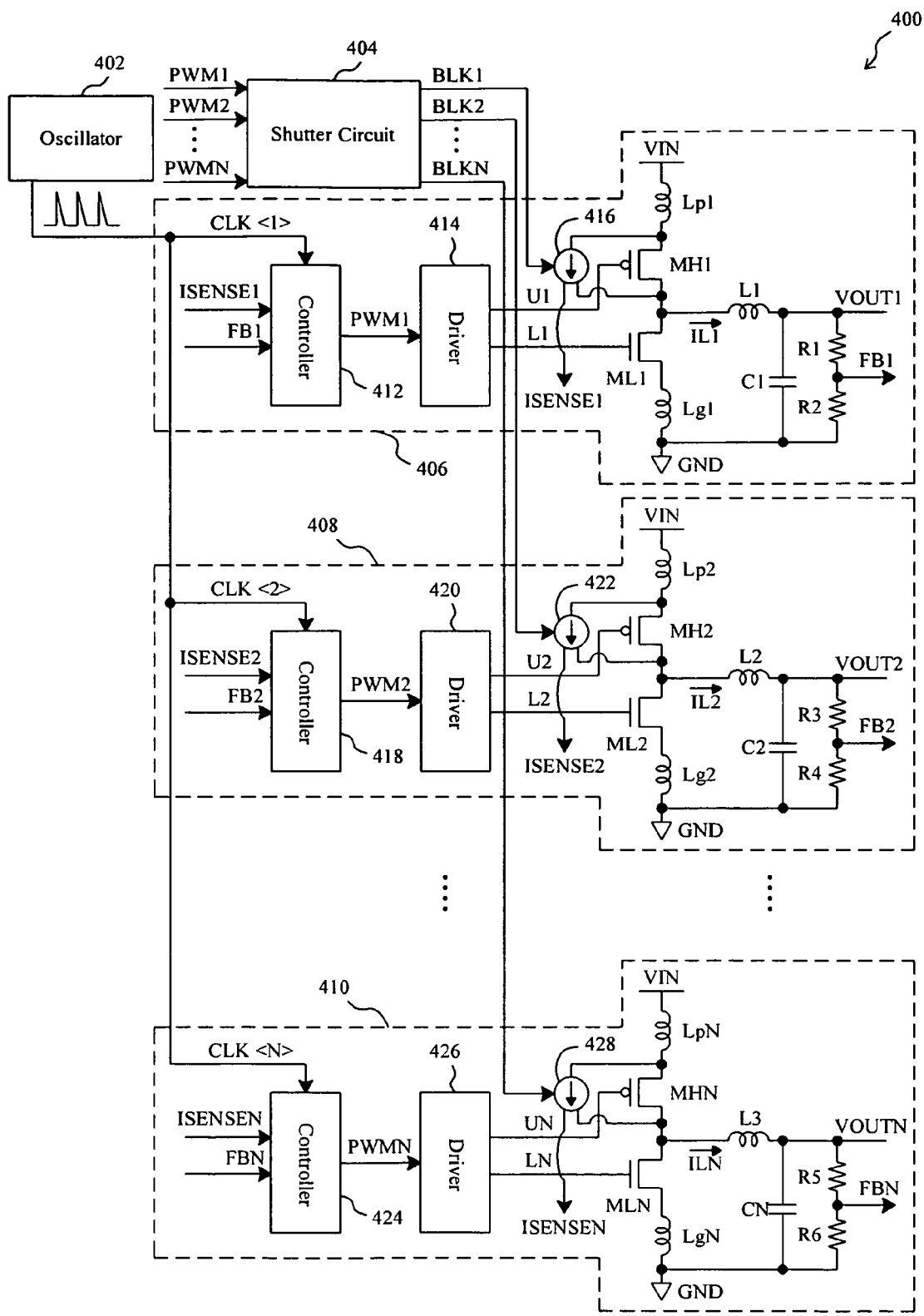
FIG. 5 provides one preferred embodiment of the present invention.

As shown in the embodiment of FIG. 5, in a multi-channel switching converter 400, an oscillator 402 provides clocks CLK<1>, CLK<2>, ..., CLK<N> for channels 406, 408, ..., 410, respectively. The channel 406 has a driver 414 to generate signals U1 and L1 according to a pulse-width modulation signal PWM1 so as to switch the transistors MH1 and ML1 serially connected between a power line VIN and a ground line or substrate GND, thereby generating an output voltage VOUT1, voltage divider resistors R1 and R2 to divide the output voltage VOUT1 to generate a feedback signal FB1, a current sensor 416 to detect the current flowing through the transistor MH1 to generate a current-sensing signal ISENSE1, and a controller 412 to generate the pulse-width modulation signal PWM1 according to the current-sensing signal ISENSE1 and the feedback signal FB1. The channel 408 has a driver 420 to generate signals U2 and L2 according to a pulse-width modulation signal PWM2 so as to switch the transistors MH2 and ML2 serially connected between the power line VIN and the ground line or substrate GND, thereby generating an output voltage VOUT2, voltage divider resistors R3 and R4 to divide the output voltage VOUT2 to generate a feedback signal FB2, a current sensor 422 to detect the current flowing through the transistor MH2 to generate a current-sensing signal ISENSE2, and a controller 418 to generate the pulse-width modulation signal PWM2 according to the current-sensing signal ISENSE2 and the feedback signal FB2. The N-th channel 410 has a driver 426 to generate signals UN and LN according to a pulse-width modulation signal PWMN so as to switch the transistors MHN and MLN serially connected between the power line VIN and the ground line or substrate GND, thereby generating an output voltage VOUTN, voltage divider resistors R5 and R6 to divide the output voltage VOUTN to generate a feedback signal FBN, a current sensor 428 to detect the current flowing through the transistor MHN to generate a current-sensing signal ISENSEN, and a controller 424 to generate the pulse-width modulation signal PWMN according to the current-sensing signal ISENSEN and the feedback signal FBN. Particularly, a shutter circuit 404 monitors all the pulse-width modulation signals PWM1, PWM2, ..., PWMN of the all channels 406, 408, ..., 410 to extract the switching information of the transistors MH1, ML1, MH2, ML2, ..., MHN, MLN and thereby generates blanking signals BLK1, BLK2, ..., BLKN for the channels 406, 408 and 410 to blank the switching noise caused by the switching of the transistors MH1, ML1, MH2, ML2, ..., MHN, MLN.

Figure 6:
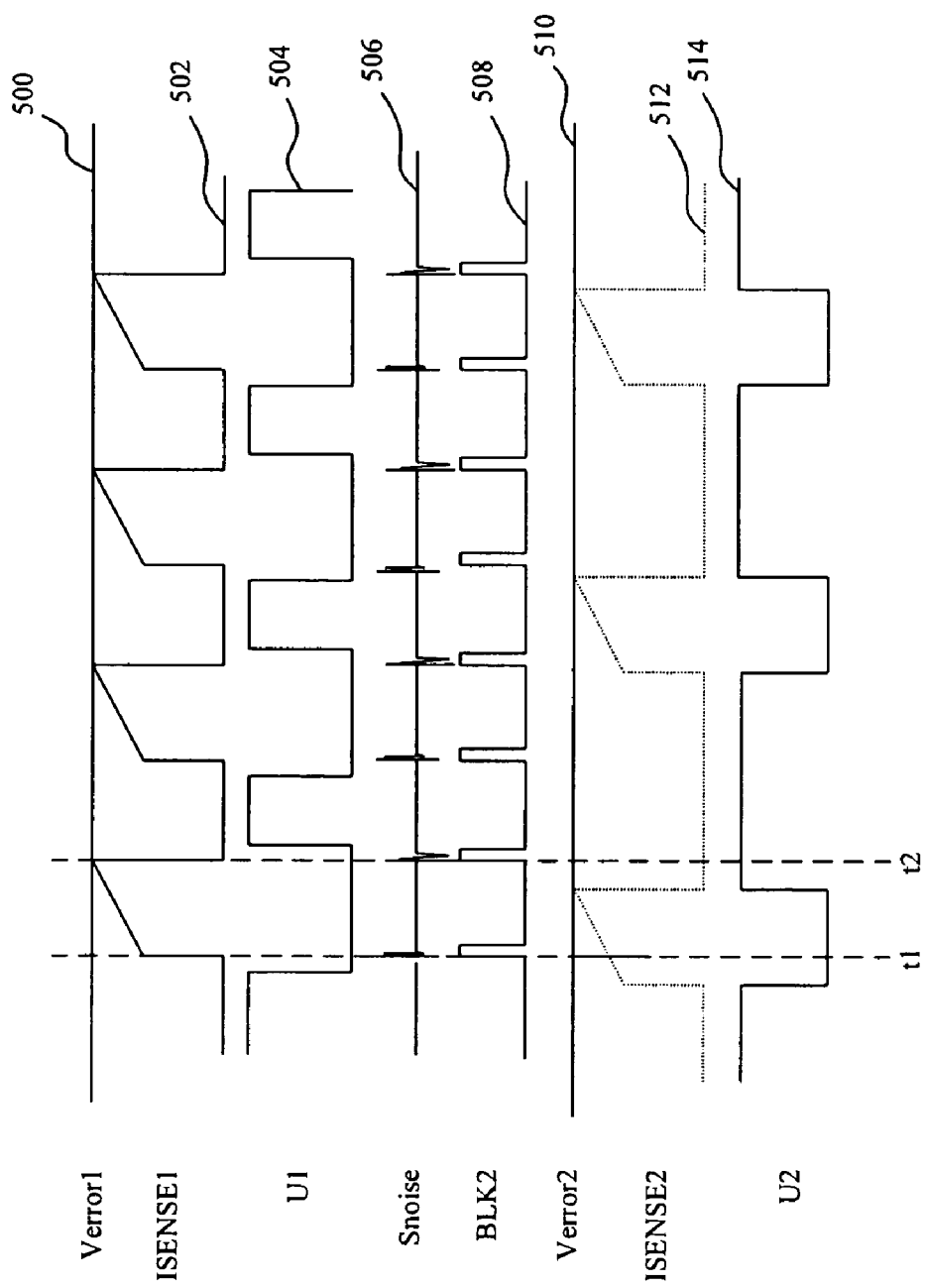
FIG. 6 illustrates the operation of the converter of FIG. 5.

FIG. 6 illustrates the operation of the converter 400 of FIG. 5, in which waveform 500 represents a threshold Verror1, waveform 502 represents the current-sensing signal ISENSE1, waveform 504 represents the signal U1, waveform 506 represents the switching noise Snoise, waveform 508 represents a blanking signal BLK2, waveform 510 represents another threshold Verror2, waveform 512 represents the current-sensing signal ISENSE2, and waveform 514 represents the signal U2. The threshold Verror1 is produced by amplifying the difference between the feedback signal FB1 and a preset reference voltage with an error amplifier, and the threshold Verror2 is also a result of amplifying the difference between the feedback signal FB2 and the preset reference voltage. When the current-sensing signals ISENSE1 and ISENSE2 are higher than the thresholds Verror1 and Verror2, respectively, the transistors MH1 and MH2 will be turned off. Taking the channels 406 and 408 for example, at time t1, in response to the signal U1 transiting to low, the transistor MH1 is turned on and will not be turned off unless the current-sensing signal ISENSE1 rises up to the threshold Verror1, as indicated at another time t2. Each time the transistor MH1 is turned on or off, a switching noise Snoise is produced, as shown by the waveform 506. The shutter circuit 404 monitors the pulse-width modulation signal PWM1 of the channel 406, and when the pulse-width modulation signal PWM1 changes its state to switch the transistor MH1, as shown at time t1, the shutter circuit 404 swiftly sends out the blanking signal BLK2 to signal the current sensor 422 of the channel 408. As a result, during the presence of the switching noise Snoise, the current-sensing signal ISENSE2 is blocked or the current sensor 422 is blocked so as not to detect the current flowing through the transistor MH2, and thereby the switching noise Snoise is prevented from superimposing to the current-sensing signal ISENSE2 to make the signal U2 turn on or off the transistor MH2 at wrong timing.

In this embodiment, each switching noise Snoise is blanked. However, not all the switching noise Snoise will interfere the operation of the channel 408. For example, when the transistor MH2 is turned off, since no current flows therethrough, the switching noise Snoise will not affect the channel 408 while the transistor MH2 is off. Therefore, it is feasible to optionally blank the switching noise Snoise. Alternative to the above embodiment, it may blank the switching noise Snoise by blocking the pulse-width modulation signal PWM2. Moreover, the blanking periods of the blanking signals BLK1, BLK2, ..., BLKN may vary along with the lengths of the switching noise Snoise.

Figure 7:
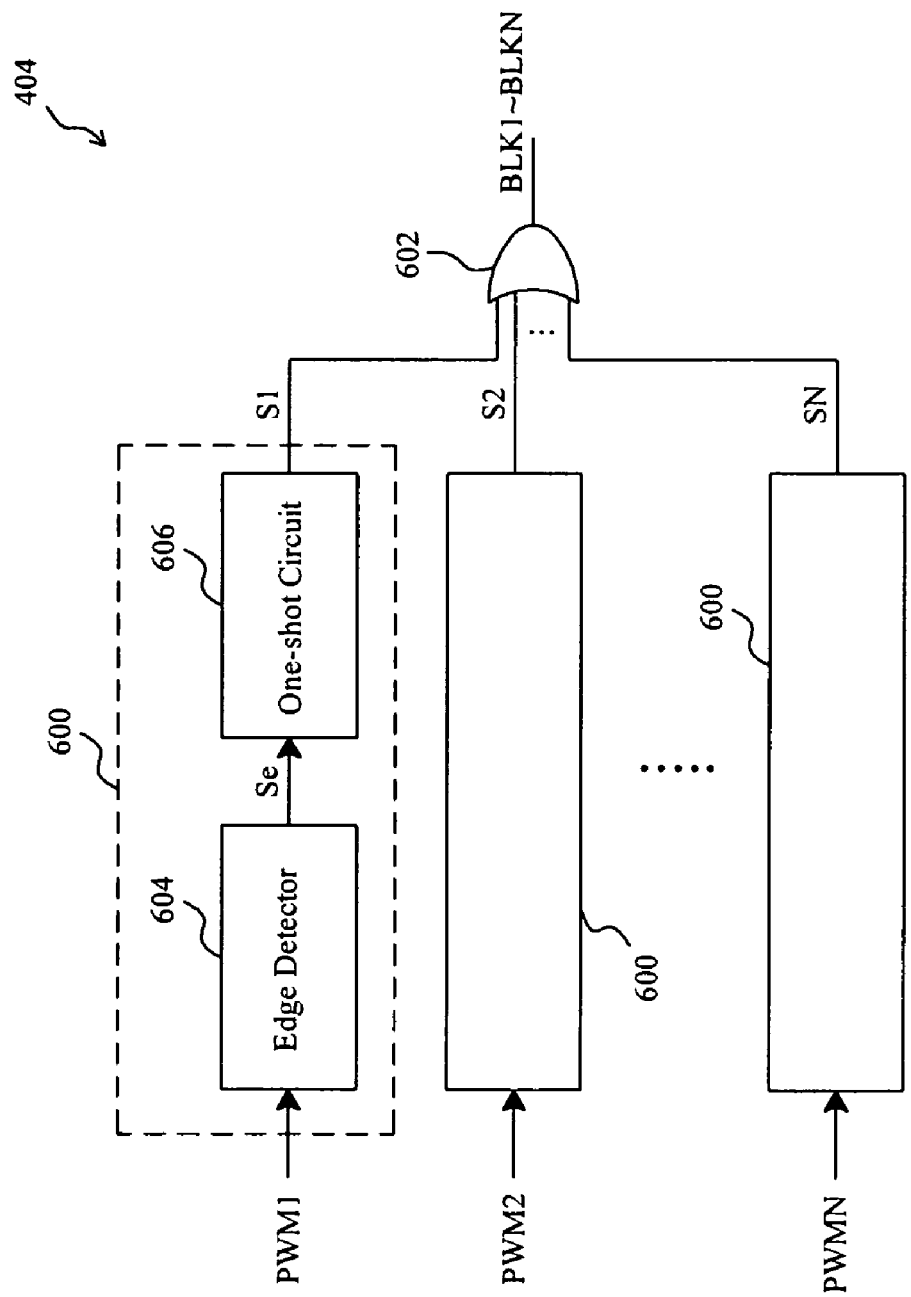
FIG. 7 shows one preferred embodiment of the shutter circuit of FIG. 5.

FIG. 7 shows one preferred embodiment of the shutter circuit 404 of FIG. 5, in which the pulse-width modulation signals PWM1, PWM2, ..., PWMN of the channels 406, 408, ..., 410 are monitored by a respective sub-circuit 600, and each sub-circuit 600 has an edge detector 604 to detect the rising edge and falling edge of its monitored pulse-width modulation signal so as to generate an edge signal Se, and a one-shot circuit 606 to trigger a signal Sj, j=1, 2, . . . , N. All the signals S1, S2, . . . , SN are connected to the inputs of an OR gate 602 to determine the blanking signals BLK1, BLK2, . . . , BLKN. The blanking periods of the signals S1, S2, . . . , SN may vary along with the lengths of the switching noise Snoise.

Figure 8:
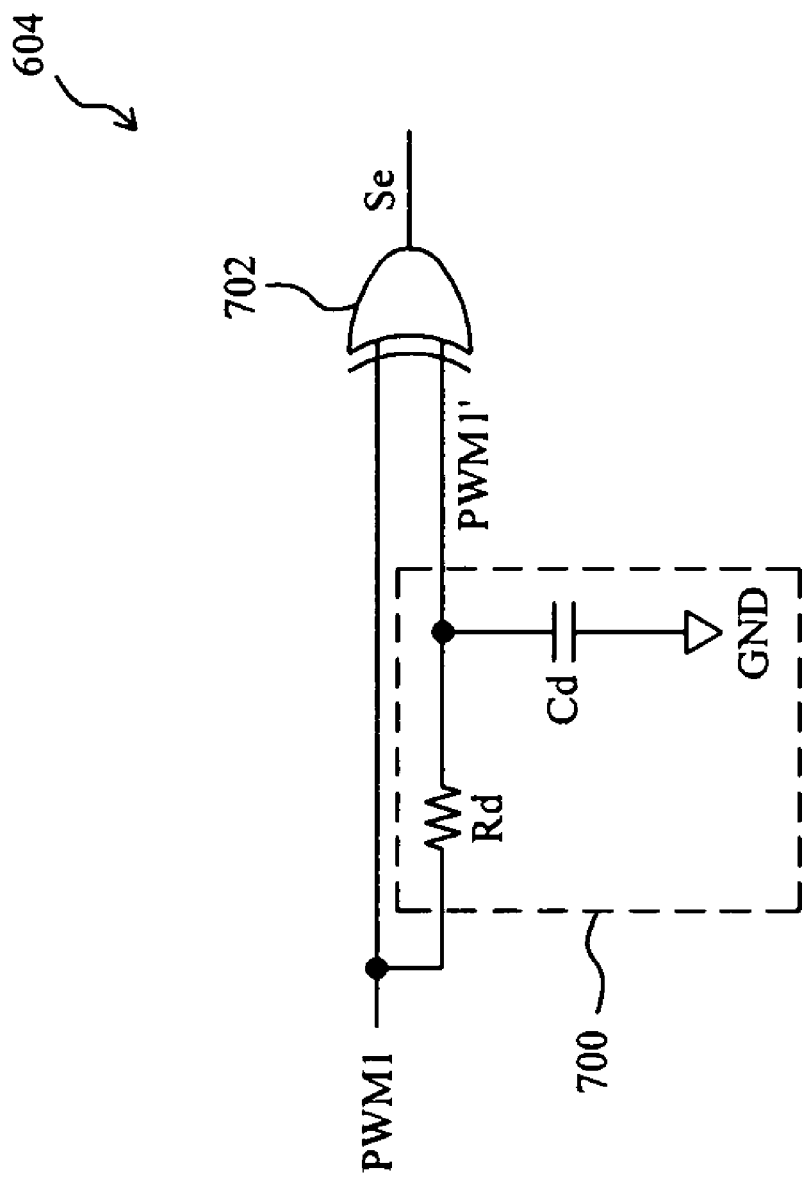
FIG. 8 shows one preferred embodiment of the edge detector of FIG. 7.

FIG. 8 shows one preferred embodiment of the edge detector 604 of FIG. 7, in which an RC delay circuit 700 delays the pulse-width modulation signal PWM1 and thereby produces a signal PWM1', and an exclusive-OR (XOR) gate 702 generates the signal Se according the signals PWM1 and PWM1'. In this embodiment, when the transistor of any one of the channels is switched to cause a switching noise, the shutter circuit 404 may block all the current-sensing signals or all the current sensors of all the channels. However, in most of cases, a channel is interfered only by the switching noise caused by its adjacent channels, since the channels are switched in sequence. Thus, it may only block for the channels adjacent to the channel that produces the switching noise.

Though in the above description the synchronous current-mode converter are taken as an example to illustrate the principle of the present invention, it is to be understood that the present invention may be also applied to the converters of voltage mode, asynchronous mode, and other modes.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A switching converter, comprising:
   a plurality of channels, each channel including:
      an outputting stage having at least one switch thereof;
      a controller in response to a first signal to generate a second signal to switch the at least one switch for generating an output current; and
      a current sensor monitoring the output current to generate the first signal; and
   a shutter circuit connected to each of the current sensors in the channels;
   wherein when any one of the channels produces a switching noise due to a switching of the at least one switch thereof, the shutter circuit blanks the switching noise.

2. The switching converter of claim 1, wherein the shutter circuit comprises a plurality of sub-circuits, each sub-circuit monitoring the second signal in a respective one of the channels.

3. The switching converter of claim 2, wherein each of the sub-circuits comprises an edge detector detecting a rising edge and a falling edge of the second signal in the respective channel to trigger a third signal.

4. The switching converter of claim 3, wherein the edge detector comprises:
   a delay circuit delaying the second signal in the respective channel to generate a fourth signal; and
   an exclusive-OR gate generating the third signal according to the second signal and the fourth signal.

5. The switching converter of claim 3, wherein each of the sub-circuits further comprises a one-shot circuit in response to the third signal to generate a fourth signal for blanking the switching noise.

6. The switching converter of claim 5, wherein the fourth signal has a blanking period varying with a length of the switching noise.

7. The switching converter of claim 5, wherein the fourth signal blocks the current sensor.

8. The switching converter of claim 5, wherein the fourth signal blocks the first signal.

9. The switching converter of claim 5, wherein the fourth signal blocks the second signal.

10. The switching converter of claim 1, wherein the shutter circuit optionally blanks the switching noise.

11. A method for blanking a switching noise in a multi-channel switching converter, each channel including a current sensor monitoring an output current to generate a first signal and an output stage having at least one switch being switched by a second signal derived from the first signal to generate the output current, the method comprising the steps of:
   A. detecting a switching of the at least one switch in one of the channels; and
   B. blanking a switching noise caused by the switching of the at least one switch.

12. The method of claim 11, wherein the step A comprises detecting a rising edge and a falling edge of the second signal of the one of the channels.

13. The method of claim 11, wherein the step B comprises blocking the current sensor.

14. The method of claim 11, wherein the step B comprises blocking the first signal.

15. The method of claim 11, wherein the step B comprises blocking the second signal.

16. The method of claim 11, wherein the step B comprises optionally blanking the switching noise.

17. The method of claim 11, wherein the step B comprises blanking the switching noise for a blanking period.

18. The method of claim 17, further comprising varying the blanking period according to a length of the switching noise.

* * * * *